(12) United States Patent
Zhang et al.

(10) Patent No.: US 8,438,621 B2
(45) Date of Patent: May 7, 2013

(54) METHOD AND APPARATUS FOR SECURE MANAGEMENT OF DEBUGGING PROCESSES WITHIN COMMUNICATION DEVICES

(75) Inventors: Jiang Zhang, La Jolla, CA (US); Peter Chen, San Diego, CA (US); Bill Franks, San Diego, CA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1094 days.

(21) Appl. No.: 11/963,127

(22) Filed: Dec. 21, 2007

(65) Prior Publication Data

US 2009/0165111 A1 Jun. 25, 2009

(51) Int. Cl.
*G06F 15/16* (2006.01)
(52) U.S. Cl.
USPC ............. 726/9; 726/20; 380/229; 713/172; 713/173; 713/174
(58) Field of Classification Search .............. 713/153, 713/155, 182, 320, 172, 173, 174; 709/203, 709/204; 726/5, 34, 9, 20; 725/25; 380/229
See application file for complete search history.

(56) References Cited

U.S. PATENT DOCUMENTS

| | | | | |
|---|---|---|---|---|
| 5,572,534 | A * | 11/1996 | Trubey et al. ................. | 714/717 |
| 6,374,402 | B1 * | 4/2002 | Schmeidler et al. .......... | 717/167 |
| 6,763,370 | B1 * | 7/2004 | Schmeidler et al. .......... | 709/203 |
| 7,552,467 | B2 * | 6/2009 | Lindsay ........................... | 726/5 |
| 7,660,250 | B2 * | 2/2010 | Howe et al. ................. | 370/230.1 |
| 7,707,641 | B2 * | 4/2010 | Schmeidler et al. ............ | 726/26 |
| 2001/0019614 | A1 * | 9/2001 | Madoukh ....................... | 380/277 |
| 2002/0120837 | A1 * | 8/2002 | Maxemchuk et al. ......... | 713/153 |
| 2005/0021613 | A1 * | 1/2005 | Schmeidler et al. .......... | 709/203 |
| 2006/0174104 | A1 * | 8/2006 | Crichton et al. .............. | 713/155 |
| 2006/0271627 | A1 * | 11/2006 | Szczepanek ................... | 709/204 |
| 2006/0272023 | A1 * | 11/2006 | Schmeidler et al. ............ | 726/26 |
| 2007/0104103 | A1 * | 5/2007 | Howe et al. ................. | 370/230.1 |
| 2007/0250920 | A1 | 10/2007 | Lindsay | |
| 2009/0119698 | A1 * | 5/2009 | Kuijlaars ........................ | 725/25 |
| 2010/0083386 | A1 * | 4/2010 | Kline et al. ..................... | 726/34 |
| 2010/0332871 | A1 * | 12/2010 | Allalouf et al. ............... | 713/320 |

OTHER PUBLICATIONS

Canadian Office Action for Canadian Patent Application No. 2,646,616, dated May 31, 2011.

* cited by examiner

*Primary Examiner* — Thu Ha Nguyen
(74) *Attorney, Agent, or Firm* — Susan R. Payne

(57) ABSTRACT

A method, device and system for securely managing debugging processes within a communication device, such as a set top box or other multimedia processing device. For example, a security processor (SP) within the communication device manages the lifetime (LT) of any access token issued for use in activating debugging privileges within the communication device. The security processor authenticates an issued access token and securely delivers appropriate debug authorization information to the device controller. The security processor uses its secure, internal timer to count down the lifetime and update the remaining lifetime of the issued access token during the processing of each command by the security processor. In addition to securely managing the issuance of the access token and it's remaining lifetime, the updating process reduces any impact on the normal communications within the device. The method overcomes the issue of the communication device not having a secure internal clock.

18 Claims, 4 Drawing Sheets

METHOD AND APPARATUS FOR SECURE MANAGEMENT OF DEBUGGING PROCESSES WITHIN COMMUNICATION DEVICES

BACKGROUND OF THE INVENTION

1. Field of the Invention

The invention relates to the debugging capabilities management of communication devices, such as set top boxes and other multimedia processing devices. More particularly, the invention relates to providing secure access to and management of debugging processes and other capabilities within communication devices, such as rights to access digital media content.

2. Description of the Related Art

When communication devices, such as set-top boxes and other multimedia processing devices, are under development or need troubleshooting, developers often need to activate a debugging feature on the communication device to access RAM data, debug the operating software, and/or perform other debugging operations. However, it also is important to be able to securely manage this debugging capability, since debugging features can be an attacking point for hackers. If a hacker gains access to the debugging capability of the communication device, the hacker can modify the operating software and other code, as well as browse confidential data. For example, a hacker would be able to browse digital rights management (DRM) keys, which can allow the hacker to access the device's DRM system.

Many communication device authorization systems include an Access Token Server (ATS) for authorizing a communication device's debugging privilege. In this system, an authorized user requests debugging privileges for a communication device by providing the communication device's identification (ID) code and other information to the ATS. If the ATS approves the debugging privilege for the particular communication device, the ATS issues an access token that allows one or more debugging features to be accessed or activated within the communication device of interest. Since the debugging privilege should be limited in time, the access token is issued with a specified lifetime, after which time the communication device should securely expire the access token, thus discontinuing or deactivating any active debugging processes. However, many communication devices do not include a secure internal clock, and therefore can not securely expire access tokens used to activate debugging processes within those communication devices. Within such communication devices, if debugging privileges are not deactivated once the lifetime of the access token expires, the overall security system of the communication device can be compromised.

Therefore, it is important to be able to manage a communication device's debugging capability in a secure manner. For example, it is critical to the overall security of a communication device to be able to securely expire access tokens used to activate debugging features within the communication device.

DETAILED DESCRIPTION

Figure 1:
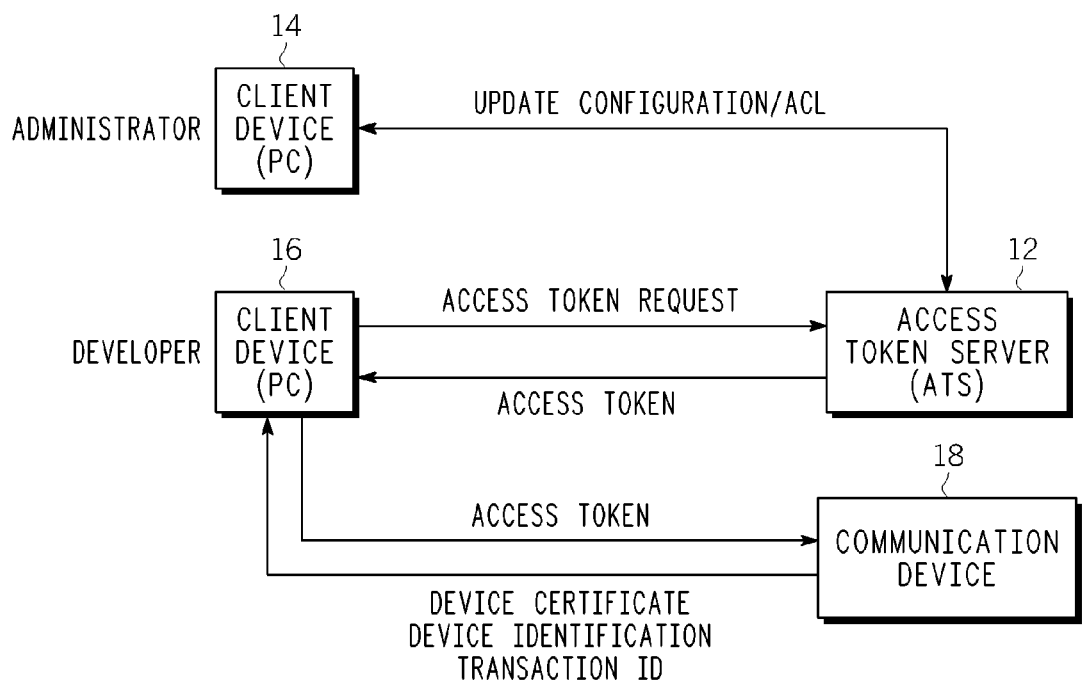
FIG. 1 is a block diagram of a system for securely managing debugging processes within a communication device.

In the following description, like reference numerals indicate like components to enhance the understanding of the debugging process management methods and devices through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The methods, devices and systems described herein involve securely managing at least a portion of the debugging processes or capabilities within a communication device, such as a set top box or other multimedia processing device. For example, a security processor (SP) within the communication device manages the lifetime (LT) of an access token or other digitally signed software object that can be issued for use in activating or accessing debugging privileges within the specific communication device identified by a unique device identifier. The security processor authenticates an issued access token and securely delivers appropriate debug authorization information to the device controller. Upon the device controller authenticating the debug authorization information and then activating the debugging process within the communication device, the security processor uses its secure, internal clock to count down the lifetime of the issued access token, as well as update the remaining lifetime of the issued access token. Also, the method updates the remaining lifetime of the access token during the processing of each command by the security processor. The method also can use a periodic "heartbeat" or status check message to notify the communication device's controller for any updated debug status information. In addition to securely managing the issuance of the access token and its remaining lifetime, the updating process reduces any impact on the normal communications within the communication device. In this manner, the method overcomes the issue of the communication device not having a secure internal clock.

Referring to FIG. 1, shown is a block diagram of a system 10 for managing debugging processes within a communication device. The system 10 includes an Access Token Server (ATS) 12, which is configured for being coupled thereto by one or more client devices. For example, a first client device 14 can be a client personal computer (PC) or other suitable client device operated by a system administrator or other suitable end user. Also, a second client device 16 can be a PC or other suitable client device operated by a programmer, developer, or service technician. The system 10 also includes a communication device 18, which, are as will be discussed in greater detail hereinbelow, is configured to provide secure debugging privileges.

The system administrator can couple the first client device 14 to the ATS 12 to communicate various information therebetween. For example, assuming the administrator is an authenticated user having a secure identification (ID), the administrator can communicate the secure ID of the client device 14 to the ATS 12. Once the ATS 12 verifies that the administrator is an authenticated user, the ATS 12 can update the configuration of the first client device 14 by communicating various configuration information to the client device 14. Such updated configuration information can include an access control list (ACL), which can include a list of permissions and privileges associated with the first client device 14.

A developer or programmer can couple the second client device 16 to the ATS 12 to communicate various information with the ATS 12. When the developer wants to debug the communication device 18, the developer first has to obtain the appropriate rights from the system administrator to request an access token, which is used to obtain debugging privileges for the communication device 18, i.e., to access or activate debugging processes within the communication device 18.

To initiate the process to request an access token, the developer obtains from the communication device 18 the device identification, the device certificate and the device ID of the communication device 18, as well as other information, including the specific debugging privilege to be requested. The developer then transmits such information to the ATS 12 as part of an access token request. If the developer is an authenticated user having a secure ID, the ATIS 12 verifies the access token request information and authorizes the requested debugging privilege by generating an appropriate access token, which includes the specific device ID. The ATS 12 transmits the access token to the developer, via the second client device 16.

The developer uses the access token to gain access to the communication device 18, e.g., to activate the requested debugging process within the communication device 18. Using the second client device 16 (or other appropriate client device), the developer transmits the access token received from the ATS 12 to the communication device 18. If the developer is an authenticated user, the communication device 18 verifies the access token, including signature and device identifier portions of the access token. The developer and the second client device 16 are then able to access the requested debugging process within the communication device 18.

Figure 2:
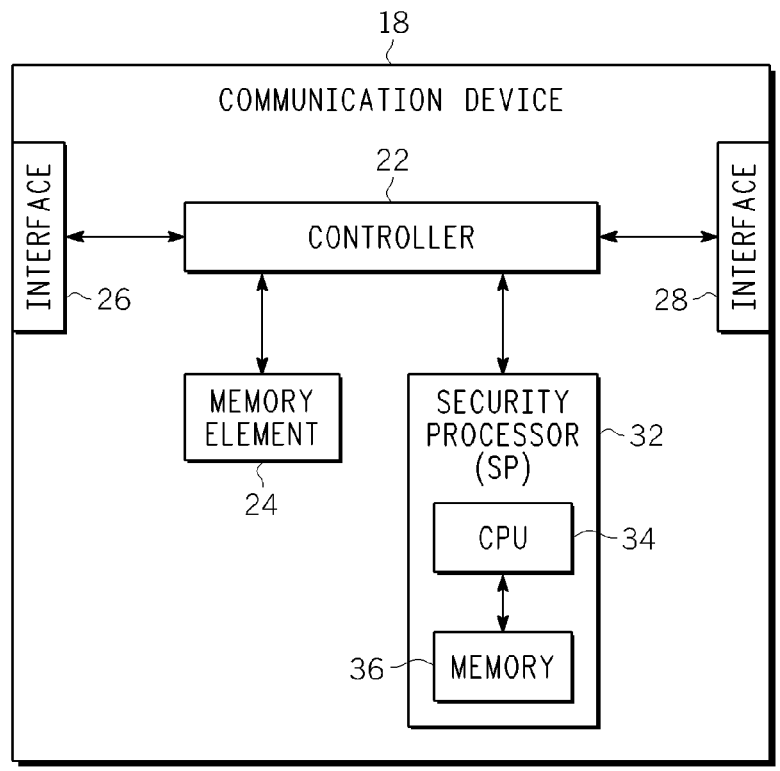
FIG. 2 is a block diagram of a communication device, such as a set top box or other multimedia processing device, including secure management of debugging processes.

Referring now to FIG. 2, with continuing reference to FIG. 1, shown is a block diagram of the communication device 18. The communication device 18 can be partially or completely any suitable device or subsystem (or portion thereof) for receiving multimedia content from a multimedia content source (not shown), storing at least a portion of the received content, processing or decoding the received multimedia content. The communication device 18 also can transmit or transfer the processed multimedia content to an end user display device (not shown), such as a television, a computer monitor or other suitable internal or external display device.

For example, the communication device 18 can be any digital video recorder (DVR) or digital video server (DVS) device, including any signal converter or decoder (set-top) box with internal and/or external recording capabilities and local and/or remote storage, which often are referred to as personal video recorder (PVR) devices. Other suitable communication devices include a residential gateway, a home media server system, a digital video disk recorder, a computer, a television with built-in or added-on multimedia content receiving and/or storing capability, or other suitable computing devices or video devices, including internet protocol (IP), satellite and cable digital video recorders, and home area network (HAN) devices and systems. The communication device also can be a mobile communication device. Suitable mobile communication devices can include mobile and handheld computing devices, such as cellular telephones, smart telephones, personal digital assistants (PDAs), wireless handheld devices, digital cameras, music players, laptop personal computers (PCs) and notebook PCs.

The communication device 18 includes a controller or processor 22 and a content storage element or memory device 24 coupled to the controller 22. In general, the controller 22 processes multimedia content and other information received and/or generated by the communication device 18. The controller 22 can be central processing unit (CPU) that includes any digital processing device, such as a microprocessor, finite state machine (FSM), digital signal processor (DSP), application specific integrated circuit (ASIC) and/or general purpose computer. In addition to the communication device 18 having the content memory device 24, the controller 22 can include at least one type of memory or memory unit (not shown) and a storage unit or data storage unit coupled to the controller for storing processing instructions and/or information received and/or created by the communication device 18.

The communication device 18 also can include one or more input and/or output interfaces for receiving and/or transmitting multimedia content and other data and information. For example, the controller 22 and other components in the communication device 18 can be coupled between a receive interface 26 and a transmit interface 28. It should be understood that one or more of the interfaces 26, 28 can be a single input/output interface (e.g., transceiver) coupled to the controller 22 and/or other components in the communication device 18.

The communication device 18 also includes a security processor 32, which includes a central processing unit (CPU) or other suitable processor 34, and at least one memory element 36, such as an electrically erasable programmable read-only memory (EEPROM) or other suitable memory element, coupled to the CPU 34. The operation of the security processor 32 will be discussed in greater detail hereinbelow.

One or more of the controller 22, the memory element 24, the interfaces 26, 28 and all or a portion of the security processor 32 can be comprised partially or completely of any suitable structure or arrangement, e.g., one or more integrated circuits. Also, it should be understood that the communication device 18 includes other components, hardware and software (not shown) that are used for the operation of other features and functions of the communication device 18 not specifically described herein.

The communication device 18, including the security processor 32, can be partially or completely configured in the form of hardware circuitry and/or other hardware components within a larger device or group of components. Alternatively, the communication device 18 can be partially or completely configured in the form of software, e.g., as processing instructions and/or one or more sets of logic or computer code. In such configuration, the logic or processing instructions typically are stored in a data storage device, e.g., the memory element 24 or other suitable data storage device (not shown). The data storage device typically is coupled to a processor or controller, e.g., the controller 22. The controller accesses the necessary instructions from the data storage device and executes the instructions or transfers the instructions to the appropriate location within the communication device 18.

Figure 3:
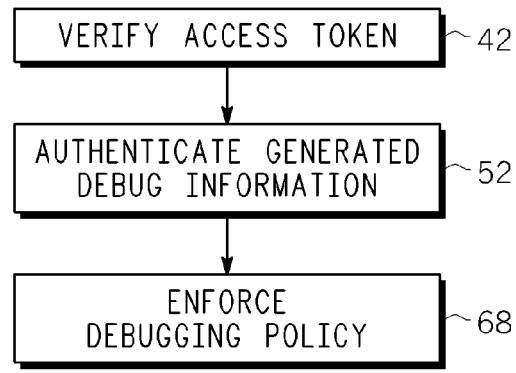
FIG. 3 is a block diagram of a method for securely managing debugging processes within a communication device.

Referring now to FIG. 3, with continuing reference to FIG. 1 and FIG. 2, shown is a block diagram of a method 40 for securely managing debugging processes within a communication device, such as the communication device 18. As discussed hereinabove, the communication device 18 needs to be able to securely verify an access token supplied by the developer to the communication device 18, securely distribute the requested debugging privileges throughout the appropriate components within the communication device 18 and securely manage all aspects of the requested debugging privilege as defined by the access token, such as the proper expiration of the activated debugging privilege.

The method 40 includes a step 42 of verifying an access token submitted to the communication device 18 by the developer, e.g., via the second client device 16. As discussed hereinabove, an access token allows a requested debugging feature or process to be accessed or activated within the communication device of interest. The access token has a data format that includes a number of data fields, including a signature data field, a device ID data field, a sequence number data field and a token descriptor data field. The token descriptor data field includes one or more token descriptors, including an access token lifetime. The access token lifetime defines or establishes for how long the requested debugging process can be activated.

Figure 4:
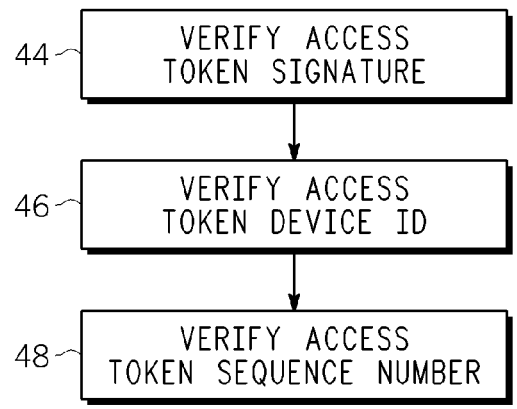
FIG. 4 is a block diagram of the access token verification step in the debugging process management method of FIG. 3.

Referring now to FIG. 4, with continuing reference to FIG. 3, shown is a block diagram of the access token verification step 42. The access token verification step 42 can include a step 44 of verifying the signature of the access token. For example, the security processor 32 can verify the signature of the access token by acquiring the public key of the ATS 12, and using the ATS public key to verify that the signature of access token was issued from the ATS 12.

The access token verification step 42 also can include a step 46 of verifying the device ID of the access token. For example, the security processor 32 can verify or confirm that the device ID portion of the access token is the same as the unit device ID stored in the memory element 36 or other secure portion of the security processor 32.

The access token verification step 42 also can include a step 48 of verifying the sequence number of the access token. For example, the security processor 32 can verify that the sequence number in the access token is greater than the sequence number stored in the memory element 36 or other secure portion of the security processor 32. If the sequence number from the access token is greater than the sequence number stored in the security processor 32, the sequence number stored in the security processor 32 shall be updated with the sequence number in the access token.

It should be understood that the memory element 36 in the security processor 32 is not directly or readily accessible from outside of the security processor 32. The only way to access the memory element 36 is through commands sent to the security processor 32. As the commands modifying the ATS public key, the device ID and the sequence number always have to pass the authorization server's signature verification first, these data can only be modified by the party that has the authorization server's private key. Therefore, the ATS public key, the device ID and the sequence number data stored in the security processor 32 are relatively secure, thus making the access token verification step 42 relatively secure as well. Alternatively, either the ATS public key or device ID can be programmed into the security processor during chip manufacture and can be made read-only after that. Otherwise, the memory element 24 can be accessed by any party and is not sufficiently secure to hold parameters such as the ATS public key, device ID and the sequence number.

As shown in FIG. 3, the method 40 also includes a step 52 of authenticating the generated debug authorization information. As discussed hereinabove, the security processor 32 generates a set of debug authorization information as a result of the access token verification step 42. Since the security processor 32 typically is not configured to activate the debug state or mode of the communication device 18, such activation typically is performed by the controller 22. Therefore, once the security processor 32 has verified the access token (step 42), the security processor 32 transfers the authenticated debug authorization information to the controller 22.

Figure 5:
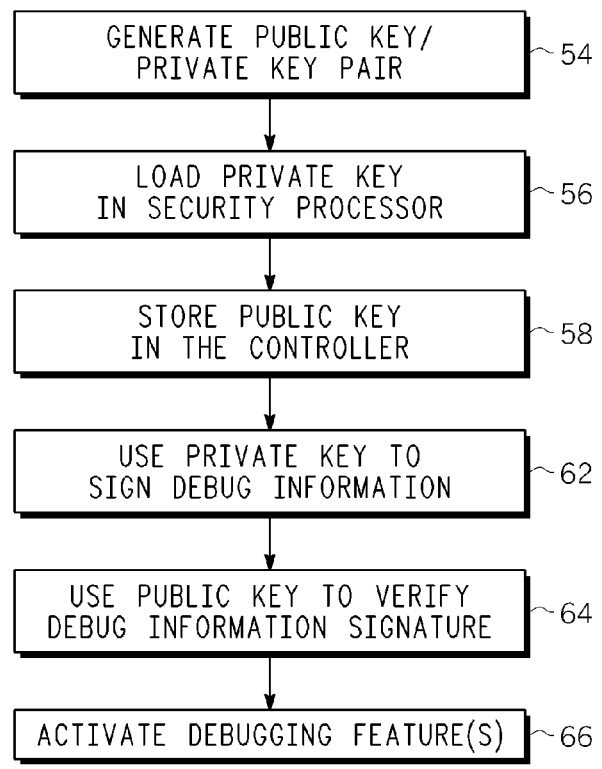
FIG. 5 is a block diagram of the debug authorization information authentication step in the debugging process management method of FIG. 3.

Referring now to FIG. 5, with continuing reference to FIG. 3, shown is a block diagram of the step 52 of authenticating the generated debug authorization information. For example, the authenticating step 52 can be performed in the manner described hereinbelow. Initially, the debug authorization information authentication step 52 can include a step 54 of generating a public key/private key pair during the manufacture and provisioning of the communication device 18, e.g., during the public key infrastructure (PKI) download of the communication device 18. For example, the step 54 can include generating an RSA (Rivest-Shamir-Adleman) public key and a corresponding private key.

The debug authorization information authentication step 52 also can include a step 56 of loading the private key in the security processor 32 portion of the communication device 18, e.g., in the memory element 36. The debug authorization information authentication step 52 also can include a step 58 of storing the corresponding public key in the communication device 18, e.g., in the controller 22 and/or the memory element 24. Both the private key storing step 56 and the public key storing step 58 also can be performed during the PKI download process.

The debug authorization information authentication step 52 also can include a step 62 of using the private key to sign the debug authorization information. When the security processor 32 wants to distribute its generated debug authorization information to the controller 22, the security processor 32 can use the private key stored therein to sign the generated debug authorization information. The security processor 32 then transfers the signed debug authorization information to the controller 22.

The debug authorization information authentication step 52 also can include a step 64 of the controller 22 using the public key to verify the signature of the debug authorization information. After the controller 22 receives the signed debug authorization information from the security processor 32, the controller 22 can use the public key stored therein and/or stored in the memory element 24 to verify the debug authorization information signature, i.e., to authenticate the debug authorization information.

The debug authorization information authentication step 52 also can include a step 66 of activating one or more debugging features or processes of the communication device 18. Once the controller 22 has verified the authenticity of the debug authorization information generated by the security processor 32 in verifying the access token, the controller can activate one or more requested debugging features and/or processes existing within the communication device 18. The secure management of such debugging features is discussed hereinbelow as part of a further discussion of the debugging policy enforcement step 68.

As shown in FIG. 3, the method 40 also includes a step 68 of enforcing the debugging policy of the communication device 18. As discussed hereinabove, once debugging features have been activated in the communication device 18, at least a portion of the debugging features needs to be enforced. For example, the lifetime of the access token allowing requested debugging features to be accessed should expire once the debugging features have been activated for the established amount of time, i.e., the amount of time set forth in the token descriptor data field within the access token. Since the communication device 18 typically does not have secure internal clock, enforcing the lifetime of the access token (and thus the lifetime of the debugging privilege) is an issue in conventional communication devices.

Figure 6:
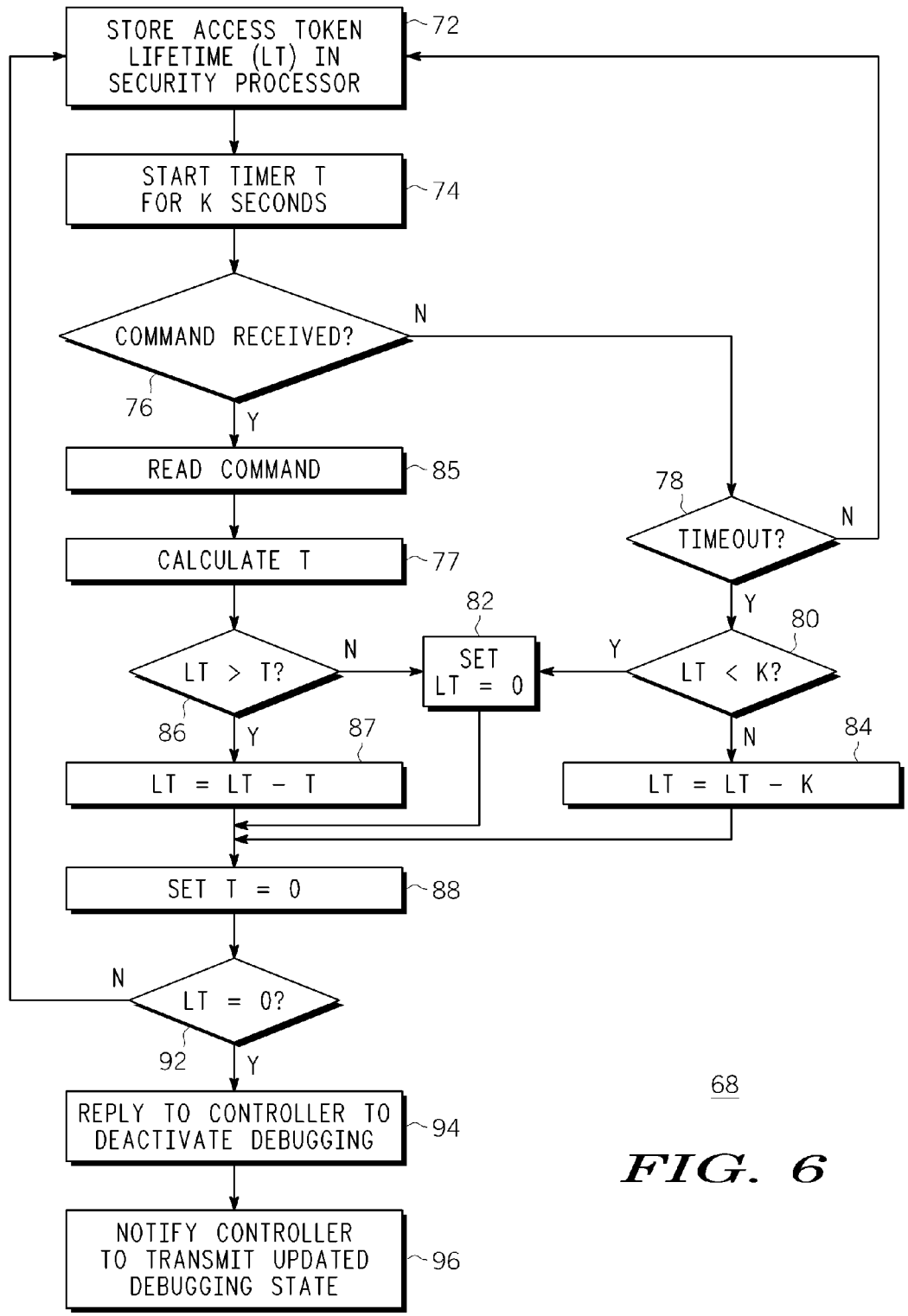
FIG. 6 is a block diagram of the debugging policy enforcement step in the debugging process management method of FIG. 3.

Referring now to FIG. 6, with continuing reference to FIG. 3, shown is a block diagram of the step 68 of enforcing at least a portion of the debugging policy within the communication device 18, such as the lifetime of the access token. For example, in general, the enforcing step 68 can be performed by using a secure clock or timer in the security processor 32 to keep track of and count down the lifetime of the access token period by period. For example, each time that the security processor 32 receives a command from the device controller it decrements the count down timer with the amount of time that has elapsed since the previous command was received. Initially, the debugging policy enforcement step 68 can include a step 72 of storing or saving the value of the lifetime of the access token within the security processor 32. Once the access token is verified, the access token lifetime value (LT) is read from the appropriate access token data field, e.g., by the security processor's CPU 34, and stored in the memory element 36. As will be discussed in greater detail herein below, the initially-read access token lifetime value is updated periodically through reduction (LT), e.g., in a manner that corresponds to the expiration of the access token.

The enforcing step 68 also includes a step 74 of starting the timer for a duration (T) of no longer than k seconds, where k seconds is equal to the time-out period for the timer. Once a requested debugging process within the communication device 18 has been activated by the controller 22, and the access token lifetime has been read by and saved within the security processor 32, the secure timer within the security processor 32 is started. The time-out value of k is determined based on several factors, e.g., the type of communication device 18, the type of applications being performed by the communication device 18 and/or the type of performance required by the communication device 18.

The enforcing step 68 also can include a step 76 of receiving a command, e.g., from the controller 22 and/or one or more other components within the communication device 18. Typically, commands received by the security processor 32 from other components within the communication device 18 will involve debugging features and other functions controlled by or involving the security processor 32.

Once a command is received by the security processor 32, the security processor 32 can perform a number of steps, prior to sending out any reply data, for determining if the lifetime of the access token has expired, and therefore whether the activated debugging feature within the communication device 18 should be deactivated. For example, when a command is received, prior to issuing any reply, the security processor 32 reads the counter value of the timer T and calculates the duration (T) since the timer's most recent starting, i.e., the amount of time the timer has been operating since the timer was last started or reset, e.g., since the execution of the timer-starting step 74. Such is shown generally as a step 77.

In operation, the security processor 32 may not receive a command (step 76) for a relatively long time when the communication device 18 is in a debugging mode. Thus, the timer may time out repeatedly before any command is received by the security processor 32. In such case, if the security processor times out (step 78), the security processor 32 compares the remaining lifetime (LT) against the time-out value k (step 80). If the remaining lifetime LT is less than the time-out value k, set the lifetime LT to 0 (step 82). Alternatively, if LT is greater than or equal to k, the value of k is deducted from LT (step 84).

If there is no timeout in step 78, then a command is read by the security processor (step 85). Also, in step 86, the security processor determines if the timer duration (T) still is less than the remaining lifetime (T<LT). If the timer duration (T) is still less than the remaining lifetime value LT, in step 87, the duration T is subtracted or deducted from the current access token lifetime value LT (i.e., LT=LT−T). If the duration T is not less than the remaining lifetime LT, set the remaining lifetime LT to 0 (step 82), which means the access token has expired now. Once the access token lifetime value LT has been reduced by the timer duration (T) or by the timeout period (k) and the access token is not yet expired, the timer duration (T) is reset to zero (T=0), as shown generally by a step 88 of setting T=0.

The security processor 32 performs a step 92 of determining whether the lifetime LT of the access token has expired, i.e., whether LT equals zero (LT=0). If LT is greater than zero, the lifetime LT of the access token has not yet expired and control returns to the step 72 of storing the updated (reduced) value of the access token lifetime LT in the security processor 32. As discussed hereinabove, the value of the lifetime LT will have been reduced either by the time-out value k, if the timer had timed out, or by the timer duration (T).

If the lifetime LT of the access token equals zero, the lifetime LT of the access token has expired. In such case, a step 94 of informing the controller 22 that the lifetime LT of the access token has expired and that the activated debugging feature in the communication device 18 should be deactivated is performed. Such information typically is part of a data reply to the controller 22, e.g., in response to the received command (step 76) from the controller 22, although such is not necessary. That is, such information does not have to be part of a data reply in response to a received command.

Also, in addition to informing the controller 22 that the access token lifetime LT has expired and that the activated debugging feature should be deactivated (step 94), the method step 68 can perform a step 96 of notifying the controller 22 to transmit updated debugging state.

If the incoming command received by the security processor 32 (step 76) is an instructional command, rather than a periodic "heartbeat" or status check command, the security processor 32 does not perform updates to the access token lifetime LT and does not update the debugging state.

In some cases, the amount of time required to determine if the access token lifetime has expired might be significant and should be accounted for to accurately keep track the access token lifetime. Furthermore, when the security processor is processing a received instructional command, it must not be interrupted with the timer so that the command can be fully processed. In such cases, the timer is temporarily stopped when any command is received and the time required to process each received command is also deducted from the lifetime LT of the access token, in addition to the duration (T) of the timer. Such is a reason that, when the communication device 18 is in the debug mode, the security processor 32 updates the remaining lifetime of the access token every time the security processor 32 receives and processes a command.

The method shown in FIGS. 3-6 may be implemented in a general, multi-purpose or single purpose processor. Such a processor will execute instructions, either at the assembly, compiled or machine-level, to perform that process. Those instructions can be written by one of ordinary skill in the art following the description of FIGS. 3-6 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the debugging management methods and devices herein described without departing from the spirit and scope of the invention as defined by the appended claims and their full scope of equivalents.

The invention claimed is:

1. A communication device, comprising:
   a controller configured to receive multimedia content, wherein the controller includes a debugging process that allows debugging of the controller operating software; and
   a security processor coupled to the controller and configured to manage the activation of the debugging process,
   wherein the security processor is configured to verify an access token received by the communication device for allowing activation of the debugging process, wherein the access token has a lifetime, wherein the security processor generates a set of debug authorization information in response to verifying the access token,
   wherein the controller is configured to authenticate the set of debug authorization information,
   wherein the controller is configured to activate the debugging process after successfully authenticating the set of debug authorization information, and
   wherein the security processor is configured to instruct the controller to deactivate the debugging process when the lifetime of the access token has expired.

2. The device as recited in claim 1, wherein the security processor is configured to instruct the controller to deactivate the debugging process by:
   determining the remaining amount of the lifetime of the access token in response to the security processor receiving a command from the controller,
   determining if the lifetime of the access token has expired,
   wherein, if the lifetime of the access token has not expired, reducing the remaining amount of the lifetime of the access token based on the amount of time required for the security processor to receive a command from the controller, and
   wherein, if the lifetime of the access token has expired, instructing the controller to deactivate the debugging process.

3. The device as recited in claim 2, wherein reducing the remaining amount of the lifetime of the access token includes:
   storing by the security processor the lifetime of the access token,
   starting a timer within the security processor upon the lifetime of the access token being stored in the security processor,
   stopping the timer when the security processor receives a command from the controller,
   reducing the lifetime of the access token by the amount of time elapsed on the timer between the last storage of the lifetime of the access token by the security processor and the receipt of the command by the security processor from the controller.

4. The device as recited in claim 3, wherein reducing the remaining amount of the lifetime of the access token includes setting the remaining amount of the lifetime of the access token to zero if the amount of time elapsed on the timer between the storage of the lifetime of the access token by the security processor and the receipt of the command by the security processor from the controller is greater than the remaining amount of the lifetime of the access token stored in the security processor.

5. The device as recited in claim 3, wherein reducing the remaining amount of the lifetime of the access token includes resetting the timer to zero and restarting it in response to reducing the remaining amount of the lifetime of the access token.

6. The device as recited in claim 1, wherein the security processor is configured to notify the controller to transmit updated debugging information to the security processor.

7. The device as recited in claim 1, wherein the security processor is configured to verify the access token received by the communication device by verifying an access token signature in a signature data field of the access token, verifying an access token device ID in a device ID data field of the access token, and verifying an access token sequence number in a sequence number data field of the access token.

8. The device as recited in claim 1, wherein the controller is configured to authenticate the set of debug authorization information generated by the security processor by:
   installing a communication device private key to the security processor,
   installing a public key corresponding to the communication device private key to the controller,
   wherein the security processor signs the set of debug authorization information using the communication device private key to generate a debug authorization information signature and transmits the debug authorization information signature to the controller, and
   using a communication device public key to verify the debug authorization information signature.

9. The device as recited in claim 1, wherein the communication device is selected from the group consisting of a signal converter box, a signal decoder box, a digital video recorder, a digital video disk recorder, a personal video recorder device, a set-top box, a home media server, a digital video server, a residential gateway, a video receiver, a cellular telephone, a smartphone, a personal digital assistant (PDA) device, a wireless handheld device, a communication device, a digital camera, a desktop personal computer (PC), a laptop PC and a notebook PC.

10. A method for managing a debugging process within a communication device, wherein the communication device includes a controller and a security processor coupled to the controller, comprising the steps of:
   verifying by the security processor an access token received by the communication device for allowing activation of the debugging process, wherein the access token has a lifetime, wherein the security processor generates a set of debug authorization information in response to verifying the access token,
   wherein the controller activates the debugging process upon authenticating the set of debug authorization information, and wherein the debugging process allows debugging of the controller operating software; and
   instructing by the security processor the controller to deactivate the debugging process when the lifetime of the access token expires,
   wherein the instructing step includes
      determining the remaining amount of the lifetime of the access token in response to the security processor receiving a command from the controller,
      determining if the lifetime of the access token has expired, if the lifetime of the access token has expired, instructing the controller to deactivate the debugging process within the communication device, and if the lifetime of the access token has not expired, reducing the remaining amount of the lifetime of the access token based on the amount of time required for the security processor to receive a command from the controller.

11. The method as recited in claim 10, wherein reducing the remaining amount of life of the lifetime of the access token includes:

storing by the security processor the lifetime of the access token, starting a timer within the security processor upon the lifetime of the access token being stored by the security processor, stopping the timer when the security processor receives a command from the controller, reducing the lifetime of the access token by the amount of time elapsed on the timer between the storage of the lifetime of the access token by the security processor and the receipt of the command by the security processor from the controller.

12. The method as recited in claim 11, wherein reducing the remaining amount of life of the lifetime of the access token includes setting the remaining amount of the lifetime of the access token to zero if the amount of time elapsed on the timer between the storage of the lifetime of the access token by the security processor and the receipt of the command by the security processor from the controller is greater than the remaining amount of the lifetime of the access token stored in the security processor.

13. The method as recited in claim 11, wherein reducing the remaining amount of the lifetime of the access token includes resetting the timer to zero in response to reducing the remaining amount of the lifetime of the access token.

14. The method as recited in claim 10, further comprising the step of notifying the controller to transmit updated debugging information to the security processor.

15. The method as recited in claim 10, wherein the access token includes an access token signature in a signature data field, an access token device ID in a device ID data field and an access token sequence number in a sequence number data field, and wherein the step of verifying the access token received by the communication device includes the steps of:

verifying by the security processor the access token signature in the signature data field, verifying by the security processor the access token device ID in the device ID data field, and verifying by the security processor the access token sequence number in the sequence number data field.

16. The method as recited in claim 10, further comprising the step of the controller authenticating the set of debug authorization information generated by the security processor, wherein the step of authenticating the set of debug authorization information includes the steps of:

provisioning of the security processor with a device private key, provisioning of the controller with a public key corresponding to the device private key, signing by the security processor the debug authorization information using the communication device private key to generate a debug authorization information signature, using a communication device public key to verify the debug authorization information signature.

17. The method as recited in claim 10, wherein the communication device is selected from the group consisting of a signal converter box, a signal decoder box, a digital video recorder, a digital video disk recorder, a personal video recorder device, a set-top box, a home media server, a digital video server, a residential gateway, a video receiver, a cellular telephone, a smartphone, a personal digital assistant (PDA) device, a wireless handheld device, a communication device, a digital camera, a desktop personal computer (PC), a laptop PC and a notebook PC.

18. A non-transitory computer readable medium storing instructions that, when executed on a programmed processor, carry out a method for managing a debugging process within a communication device, comprising:

instructions for verifying an access token received by the communication device for allowing activation of the debugging process, wherein the access token has a lifetime;

instructions for generating a set of debug authorization information in response to verifying the access token, wherein the controller activates the debugging process upon authenticating the set of debug authorization information, and wherein the debugging process allows debugging of the controller operating software; and instructions for informing the controller to deactivate the debugging process when the lifetime of the access token expires, wherein the informing instructions include instructions for determining the remaining amount of the lifetime of the access token in response to the security processor receiving a command from the controller, instructions for determining if the lifetime of the access token has expired, if the lifetime of the access token has expired, instructions for informing the controller to deactivate the debugging feature within the communication device, and if the lifetime of the access token has not expired, instructions for reducing the remaining amount of the lifetime of the access token based on the amount of time required to receive a command from the controller.

* * * * *